(12) United States Patent
Gabara et al.

(10) Patent No.: US 9,126,074 B2
(45) Date of Patent: *Sep. 8, 2015

(54) APPARATUS AND METHOD TO IMPROVE TODDLER'S STEPS AND MOBILITY

(71) Applicant: TrackThings LLC, Murray Hill, NJ (US)

(72) Inventors: Serena Marlene Gabara, Murray Hill, NJ (US); Helen Mary Gabara, Murray Hill, NJ (US); Thaddeus John Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,265

(22) Filed: Dec. 13, 2013

(65) Prior Publication Data

US 2014/0100084 A1    Apr. 10, 2014

Related U.S. Application Data

(63) Continuation of application No. 13/110,037, filed on May 18, 2011, now Pat. No. 8,616,893.

(51) Int. Cl.
*G09B 19/00* (2006.01)
*A63B 23/04* (2006.01)
*A63B 24/00* (2006.01)

(52) U.S. Cl.
CPC ......... *A63B 23/0464* (2013.01); *A63B 24/0087* (2013.01); *G09B 19/00* (2013.01); *G09B 19/0038* (2013.01)

(58) Field of Classification Search
USPC ......... 434/247, 255, 258; 108/11, 12, 144.11, 108/147.18, 147.19, 147.21, 147.22; 446/71, 482; 482/35, 36, 41, 42
See application file for complete search history.

(56) References Cited

U.S. PATENT DOCUMENTS

| D185,371 | S | | 6/1959 | Klein |
| 3,855,946 | A | | 12/1974 | Bales |
| 4,635,565 | A | * | 1/1987 | Novak ........................... 108/147 |
| 5,224,429 | A | * | 7/1993 | Borgman et al. ............. 108/147 |
| 5,282,593 | A | * | 2/1994 | Fast ........................... 248/188.4 |
| 5,323,695 | A | * | 6/1994 | Borgman et al. ............. 108/147 |
| 5,876,262 | A | | 3/1999 | Kelly et al. |
| 5,881,404 | A | | 3/1999 | Knight |

(Continued)

OTHER PUBLICATIONS

Jan. 2010 in the Journal of Neurophysiology entitled "Kinematic Strategies in Newly Walking Toddlers Stepping Over Different Support Surfaces", by Dominici et al.

*Primary Examiner* — Kurt Fernstrom
(74) *Attorney, Agent, or Firm* — Thaddeus Gabara; Tyrean Patent Prosecution Law Firm

(57) ABSTRACT

An apparatus which can be operated in one of two modes. The apparatus has a plurality of legs, a processor, at least one electronic motor controlled by the processor, a plurality of mechanical gears coupled to the at least one electronic motor, the plurality of mechanical gears are configured to adjust a length of the at least one leg wherein a point on a surface of the apparatus can be adjusted in height. The plurality of legs can be adjusted in length to slant the surface of the apparatus at an angle or to vary a height of the surface of the apparatus. The two modes may include an upside down mode wherein the apparatus is configured to operate as a toddler gym or a right side up mode where the apparatus is configured to operates as the table.

20 Claims, 21 Drawing Sheets

(56) References Cited

U.S. PATENT DOCUMENTS

| | | |
|---|---|---|
| 6,112,748 A | 9/2000 | Esdale et al. |
| 6,131,929 A | 10/2000 | Haley |
| 6,595,144 B1 * | 7/2003 | Doyle .......................... 108/147 |
| 6,920,834 B1 | 7/2005 | Pehta et al. |
| 7,412,931 B2 | 8/2008 | Seidl et al. |
| 7,862,409 B1 | 1/2011 | Sheppard |
| 8,256,359 B1 | 9/2012 | Agee |

* cited by examiner

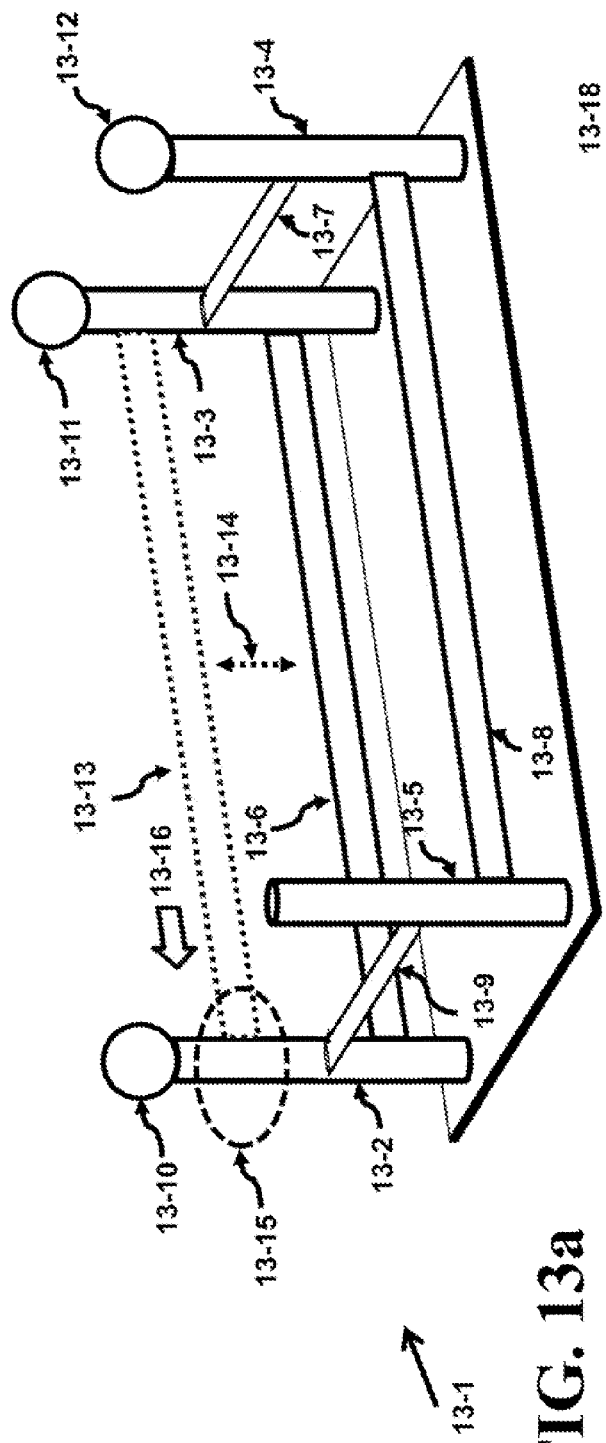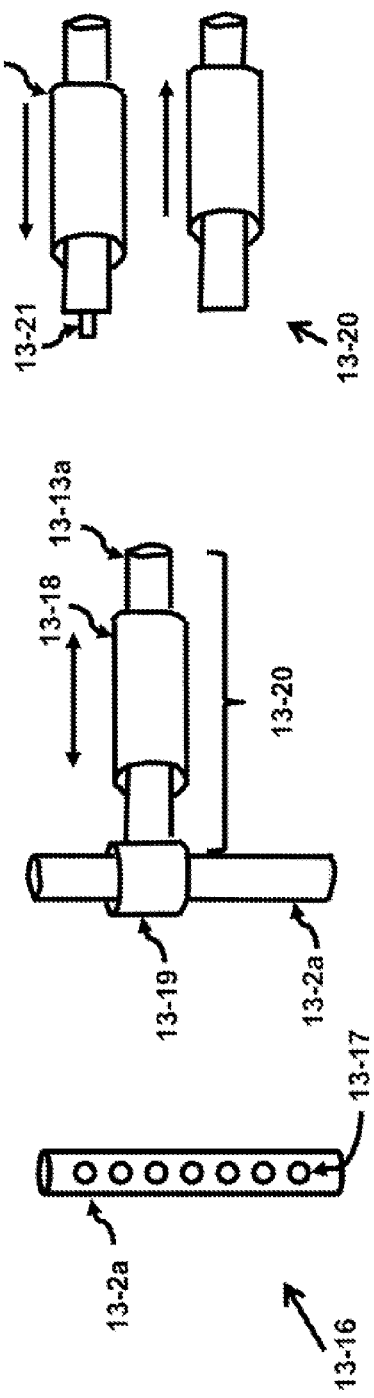

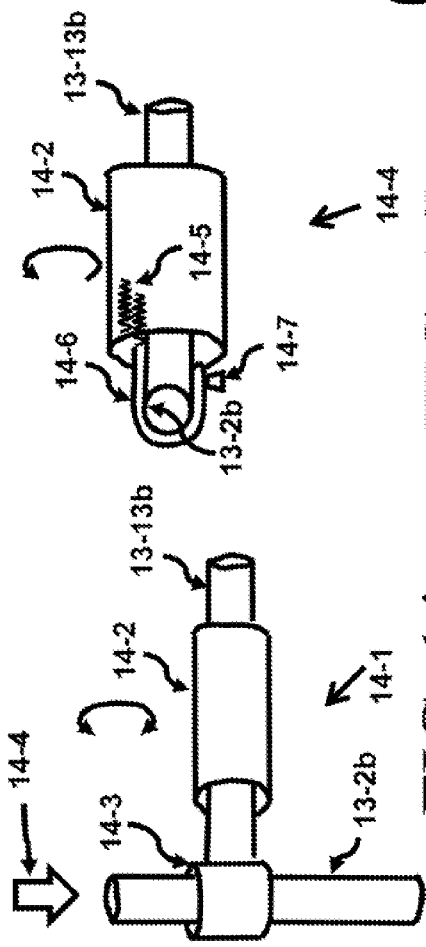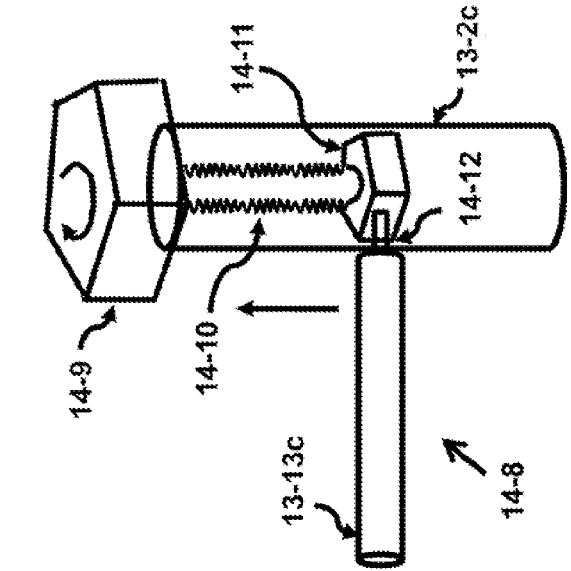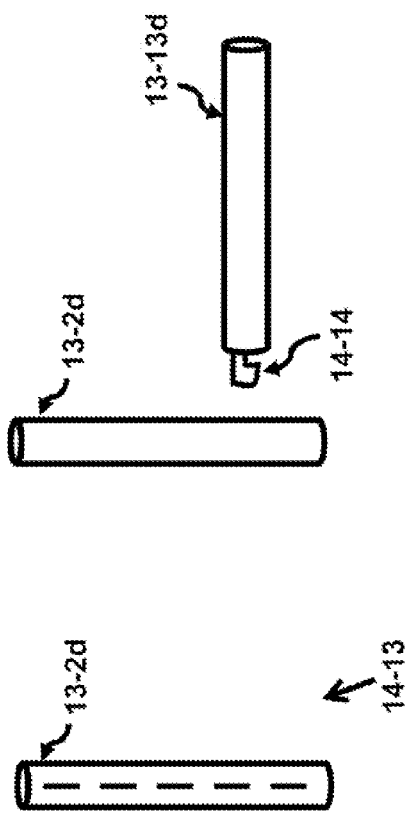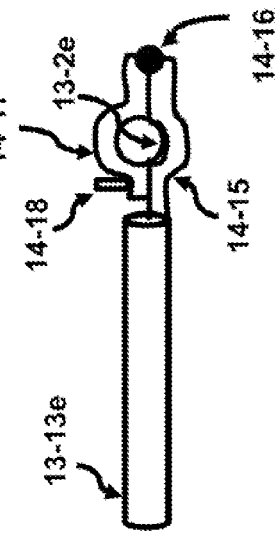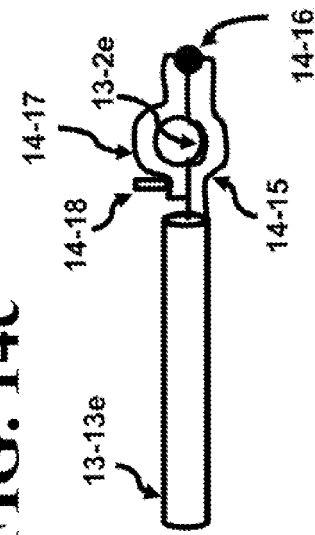

APPARATUS AND METHOD TO IMPROVE TODDLER'S STEPS AND MOBILITY

CROSS REFERENCE TO RELATED APPLICATIONS

This application is a continuation of application Ser. No. 13/110,037, filed May 18, 2011, entitled "Apparatus and Method to Improve Toddler's Steps and Mobility" which is invented by all of the inventors as the present application and is incorporated herein by reference in their entireties.

BACKGROUND OF THE INVENTION

Any child that transitions from a crawling position to one towering on two feet is beginning to understand the art of walking. Children start to learn how to walk anywhere between 8 to 14 months. In the process of this learning, the walking is unsteady and the child toddles. A toddler is a young child ranging in age from 10 months to 24 months.

The transition from crawling to walking is filled with mishaps, errors, poor judgment and poor foot placement that cause the toddler to fall onto the ground. At the same time, the transition must be exciting and exhilarating since the toddler never gives up in their determination to walk. There is a driving sprit in the toddler to master the art of walking.

A number of the toddlers require a "grip" to hold onto while they are learning to stand erect and walk. A grip is defined as a physical structure that has characteristics that allow the small hands of a toddler to grab, hold, or support themselves before they have a chance to fall. The toddlers begin to start taking steps and use this grip to maintain their balance as they begin mastering the art of walking.

One grip can be the finger of a parent. The toddler wraps their fingers around the finger of a parent to stand erect. This is probably the best loving grip for the toddler to use while learning to walk. As the toddler moves, the grip moves with the toddler. The toddler develops a strong dependence that the grip is always going to be there, allowing the toddler to concentrate more on the art of walking.

A recent report printed 20 Jan. 2010 in the Journal Of Neurophysiology entitled "Kinematic Strategies in Newly Walking Toddlers Stepping Over Different Support Surfaces", by Dominici et al. indicates that " . . . in each toddler we tried to implement unsupported stepping over an obstacle in such a way that an experimenter initially held the toddler by hand and tried to leave the toddler's hand while approaching the obstacle. In all such trials, toddlers stopped before the obstacle or attempted to touch and held again the hand of the experimenter. Thus since unsupported stepping was never successful in situations with obstacles, . . . " The studies of toddlers stepping over obstacles is very limited. The study attempted to have the toddler step unsupported over obstacles without success since the child require support. The experimenters were required to hold the toddler by one hand to negotiate the obstacles.

Often, the toddler will also experiment independently and seek to develop the art of walking on their own by using local stable inanimate objects that appear to have sufficient height. After crawling to the object, the toddlers hand seeks the "grips" of this local object. Some examples of inanimate objects that can provide a grip include a wall, a table edge and top, a chair seat and back, a sofa, a piece of folded fabric of their parent's pants and a bed.

An object that provides a grip for a long horizontal run at an appropriate constant height from the ground is extremely beneficial and is called a horizontal grip (for example, the top surface of a coffee table). Such a grip is advantageously useful for the toddler when learning to walk because the toddler can then began to take steps either knowing that the grip is readily available in case the toddler faults in their steps or if the toddler always requires the support of the grip while taking their first steps. The height from the ground for the location of the grip is anywhere between the hip and the shoulder height of the toddler.

Another important aspect to develop in the art of walking is determining what to do with obstacles in the path. One option is to go around the obstacle if it is too large; however, if the obstacle is relatively small maybe the toddler will attempt to raise their foot over the obstacle. Succeeding the ability to step over obstacles brings the toddler that much closer to mastering the art of walking.

BRIEF SUMMARY OF THE INVENTION

Toddlers are very inquisitive and seek out new challenges and objects to study as they move around the home. A first embodiment of the invention provides an apparatus and process for toddlers that include in its structure easily accessible grips. This embodiment uses a rectangular coffee table or any small table with legs that can be easily flipped with its top flat surface against the floor. The table in this inverted position exposes legs pointing into the air. In addition, the horizontal cross-support beams attached to the legs providing additional stability. The height of these cross-support beams from the floor can occur at various levels. To a toddler, the new object appears to now look like an inviting structure. The table in the upside down mode can be viewed as a "toddler gym" since a toddler could practice balancing, walking or stepping. Soon the toddler will experience that by using the toddler gym, with grips and obstacles incorporated into the structure, a determined toddler will use the toddler gym as it self learning tool. Moving between the legs on the shorter side of the rectangle provides a first grip from where the short trip starts and second grip to terminate the short trip and support the toddler if necessary. This short trip comprises at least one step taken independently and supported not by grips but the toddler themselves. This is an important step that the toddler can practice until they become confident bringing them closer to mastering the art of walking. Note that the toddler is not requiring the support of experimenters as mentioned in the earlier study, instead, the toddler is self-driven to perform these tasks independently.

Another embodiment of the invention provides an apparatus and process for toddlers that includes in its structure both easily accessible grips and obstacles. In a first attempt, the toddler attempted to step over a horizontal bar about 3 inches high unaided and failed. The toddler then proceeded to use the grip and while holding the grip, begins stepping over the obstacle until the toddle steps easily over the 3 inch obstacle. Then, the toddler proceeds to attempt an unaided step over the obstacle and succeeds.

The obstacle can be for instance, a horizontal cross support beam for the toddler to step over, or a movable step that can snap onto the horizontal cross support beam for the toddler to learn how to step up and step down from a step. The movable step is typically attached to the bottom surface of the top table surface. Once the table is placed in the upside down mode, this movable step is easily detached from the bottom surface of the table and snapped onto a horizontal cross support beam.

A yet further embodiment of the invention is a toddler table that can be used as a table while in the right side up mode and as a "toddler gym" while in the upside down mode. This toddler table will have the ability to adjust the height of the grips, of a horizontal grip and of the horizontal bar that will behave as an obstacle. In this embodiment, the horizontal bar can be an obstacle if positioned low (less than knee height) or a horizontal grip if positioned greater than hip height. Once the use of the toddler gym ceases, the toddler gym can be flipped to serve its second purpose of a table. The additional benefit is that the legs can be adjusted in height so that the table top elevation can be adjusted as the toddler grows.

A yet additional embodiment of the invention is placing motors and integrated circuit chips into key positions within the table. The integrated circuits can be used to form systems for controlling the structure of the toddler gym by adjusting the height of the grips and horizontal bar using voice control, keyboard control or by a touch pad.

An apparatus operated in one of two modes comprising: a right side up mode where the apparatus operates as a table; an upside down mode where the apparatus provides a grip and an obstacle, a toddler can hold the grip and repetitively step over the obstacle, whereby the toddler learns to successfully step over the obstacle without holding the grip, a plurality of legs, a plurality of cross support beams, at least one leg with the grip, at least one cross support beam being the obstacle, a protective foam covering exposed surfaces in the upside down mode, at least one cross support beam is adjustable in height, a beam clamping means to secure the cross support beam, the cross support beam at a height greater than a hip of the toddler, whereby the cross support beam provides a horizontal grip for the toddler and, a positional step that snaps onto the obstacle, whereby the toddler can practice stepping up and stepping down the positional step. The apparatus, further comprising: at least one leg is telescopic in length, and a leg clamping means to secure the telescopic leg.

A method of training a toddler to step over an obstacle, comprising the steps of flipping a table upside down, locating a grip and an obstacle in the upside down table, holding the grip so a toddler steadies themselves, locating the obstacle substantially equal to a height of a toddler's step, stepping over the obstacle until the toddler's step consistently clears the obstacle, whereby the toddler releases the grip and successfully steps over the obstacle, covering exposed surfaces of the upside down table with a protective foam, telescoping a length of at least one leg, securing the telescopic leg with a clamp, adjusting at least one cross support beam in height, securing the at least one cross support beam to a given height and, adjusting the given height greater than the hip of the toddler, whereby the cross support beam provides a horizontal grip for the toddler. The method further comprising the steps of snapping a positional step on the obstacle, whereby the toddler can practice stepping up and stepping down the positional step.

An apparatus with two modes comprising, an upside down mode where the apparatus provides a grip, a horizontal grip and an obstacle, a protective foam covers exposed surfaces hi the upside down mode, telescopic legs adjustable in length, cross support beams adjustable in height and a right side up mode where the apparatus presents a table with a flat surface at a slope, whereby the slope of the flat surface is dependent on a length distribution of the telescopic legs, whereby a toddler uses the upside down mode to learn how to step over the obstacle, whereby a toddler uses the upside down mode to practice assisted walking by holding the horizontal grip.

BRIEF DESCRIPTION OF THE DRAWINGS

Please note that the drawings shown in this specification may not be drawn to scale and the relative dimensions of various elements in the diagrams are depicted schematically and not necessary to scale.

FIG. 13a depicts a toddler gym with a height adjusting horizontal bar illustrating this inventive technique.

FIG. 13b illustrates perforated holes in the body of the leg illustrating this inventive technique.

FIG. 13c shows the horizontal bar coupled to the leg illustrating this inventive technique.

FIG. 13d depicts movements to latch and unlatch the horizontal bar illustrating this inventive technique.

FIG. 14a illustrates the horizontal bar coupled to the leg illustrating this inventive technique.

FIG. 14b depicts the belt and screw to adjust the friction of the horizontal bar illustrating this inventive technique.

FIG. 14c illustrates a bolt adjusting mechanism to adjust the height of the horizontal bar illustrating this inventive technique.

FIG. 14d shows a side view of the leg with vertical slots illustrating this inventive technique.

FIG. 14e depicts movements to latch and unlatch the horizontal bar illustrating this inventive technique.

FIG. 14f illustrates a clamp and lock to adjust the horizontal bar illustrating this inventive technique.

DETAILED DESCRIPTION OF THE INVENTION

This inventive embodiment uses a common everyday object and converted the object into a useful learning tool. The tool helps toddlers master the art of walking. This occurs since a horizontal bar can be repositioned at any level from the floor. In one case, providing an obstacle to step over, and in another case, providing a horizontal grip that the toddler can use to practice walking. In addition, the vertical grips can be adjusted in height to address the growth of the toddler.

Figure 1A:
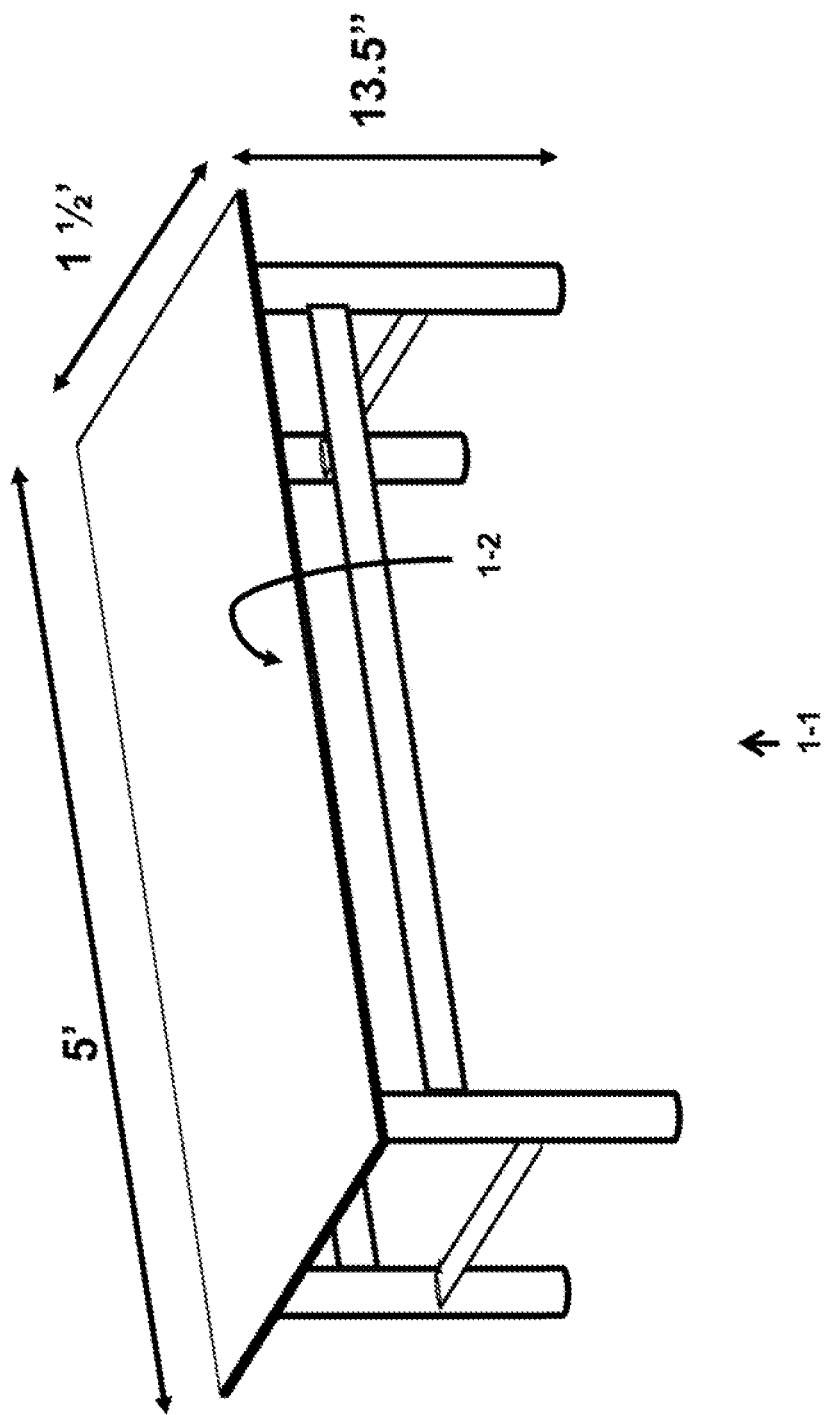
FIG. 1a shows a conventional coffee table with its top surface upright called the right side up mode.

FIG. 1a illustrates a coffee table 1-1. This is a typical coffee table with a rectangular top surface 1-2 of 5 by 1.5 feet standing 13.5 inches high. The table has 4 legs and cross support beams to hold the legs in place.

Figure 1B:
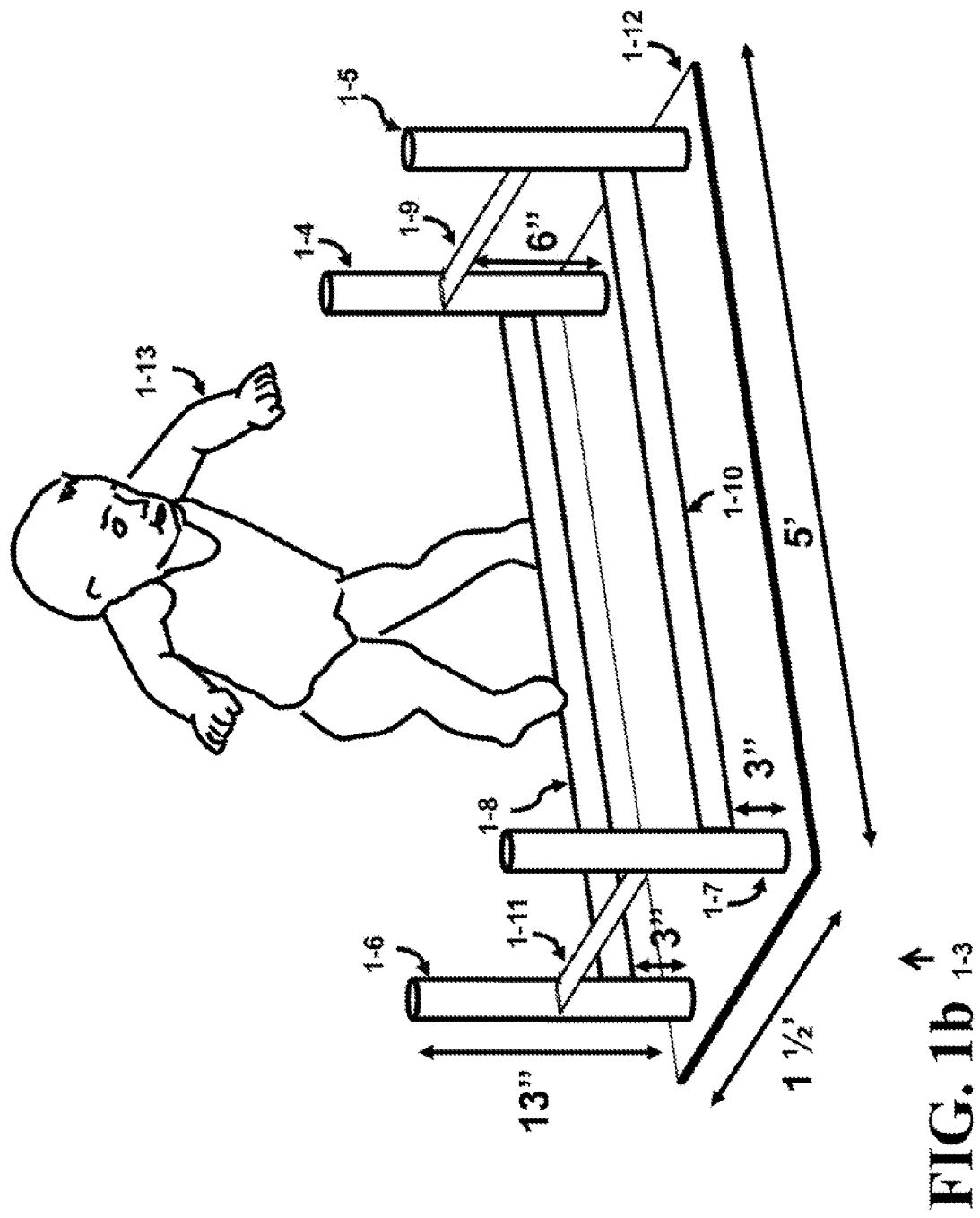
FIG. 1b depicts the conventional coffee table in the upside down mode with its top surface upside down on the surface of the floor and a toddler attempting to step over a horizontal bar illustrating this inventive technique.
Figure 2:
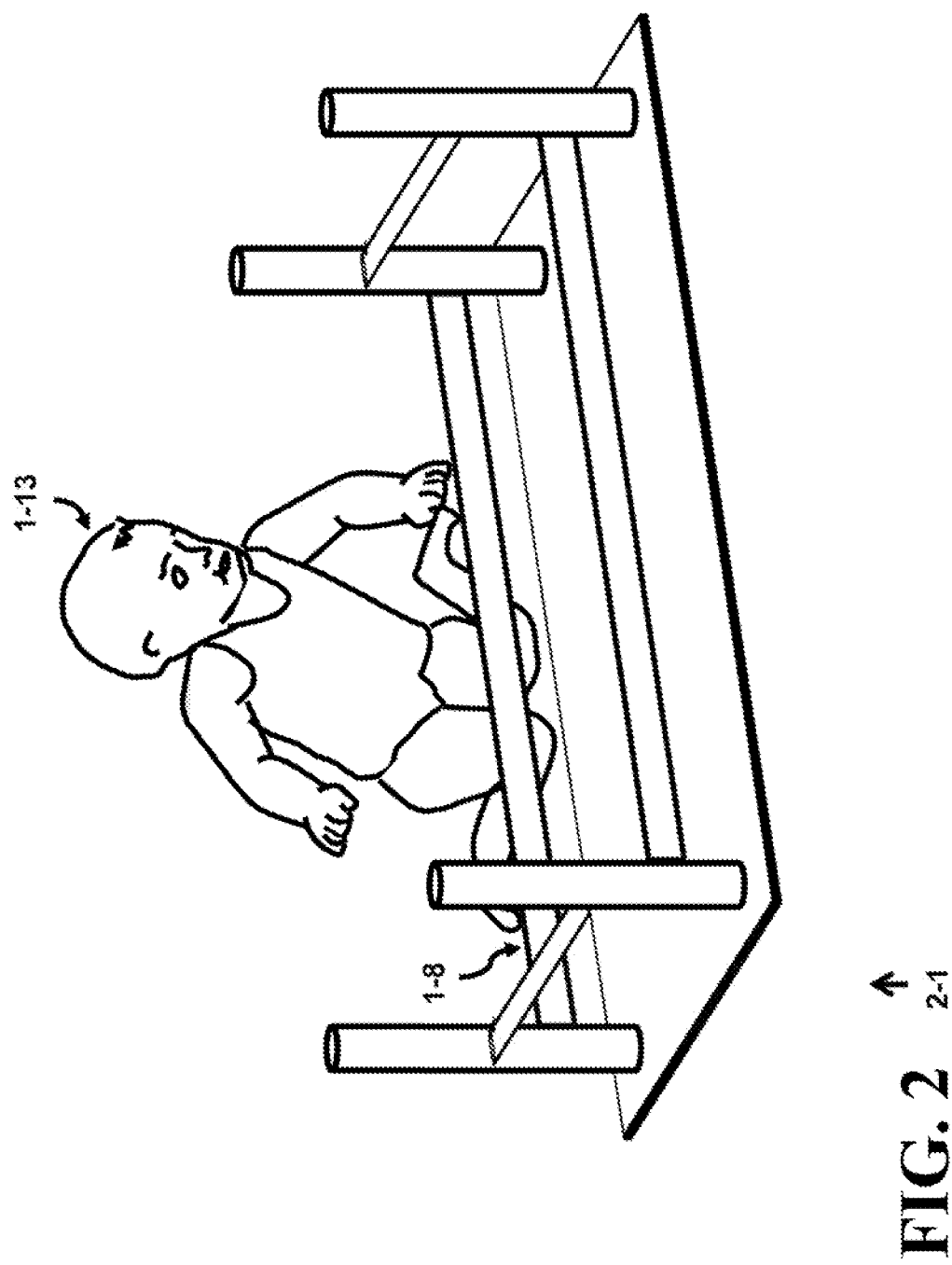
FIG. 2 illustrates a failed attempt in independently stepping over a horizontal bar illustrating this inventive technique.

FIG. 1b illustrates the invention where the table in FIG. 1a has been flipped into the upside down mode 1-3 with the top surface 1-2 of the table in contact with the floor. The table was flipped to expose the legs and cross support beams. This structure exposes the legs 1-4 to 1-7 and cross support beams 1-8 to 1-11. Two of the cross support beams 1-8 and 1-10 are 3 inches in height measured from the bottom surface of the table top 1-12. The remaining two cross support beams 1-9 and 1-11 are 6 inches from the bottom surface of the table top. The flipped table was in the presence of a toddler 1-13 who became intrigued with the new structure. The toddler 1-13 approached the structure and attempted to step over the cross support beam 1-8 unaided. FIG. 2 illustrates that the toddler 1-13 has failed to step over the cross support beam 1-8 and instead collapsed on their own legs.

Figure 3:
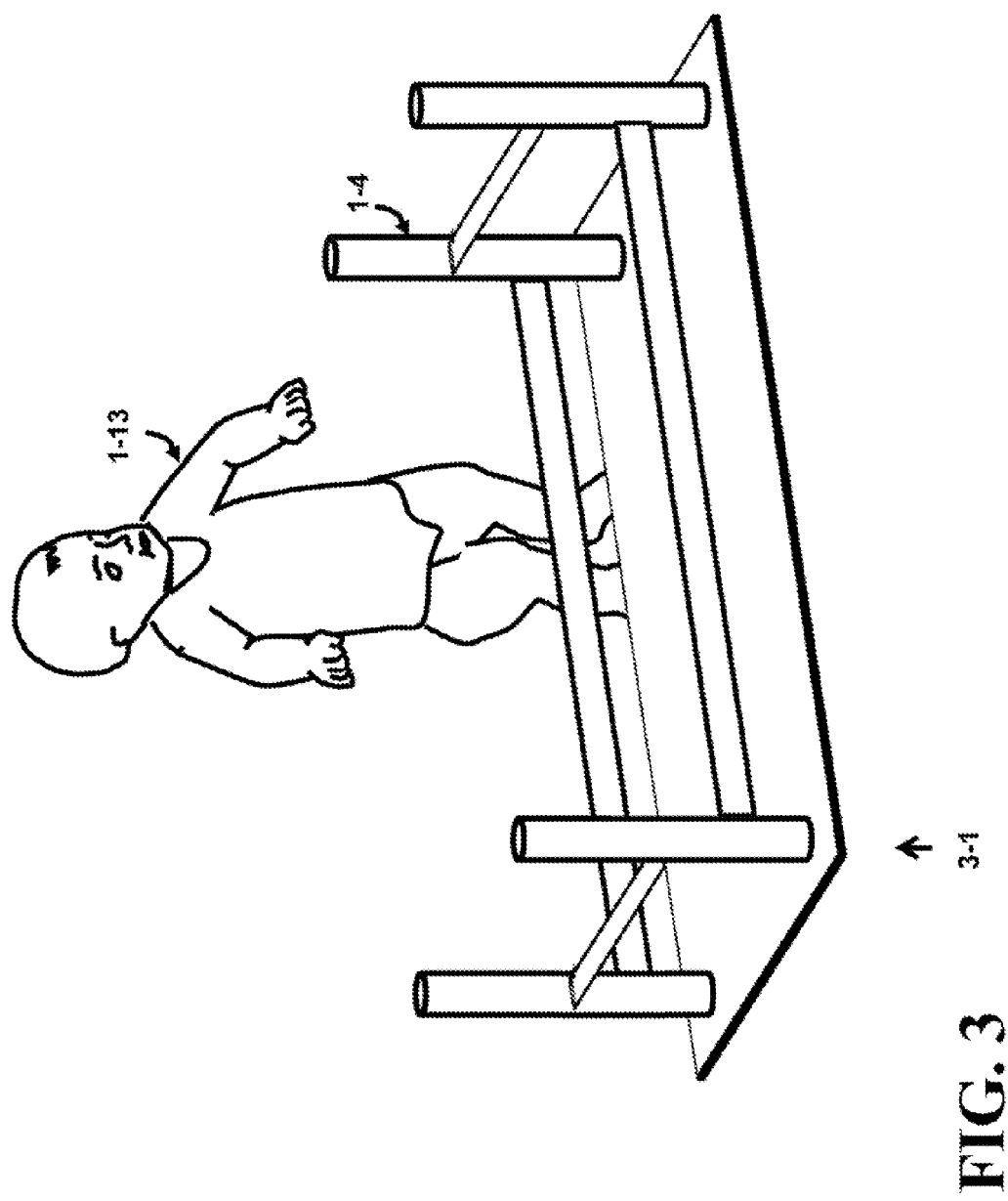
FIG. 3 shows the toddler preparing to step over the horizontal bar illustrating this inventive technique.
Figure 4:
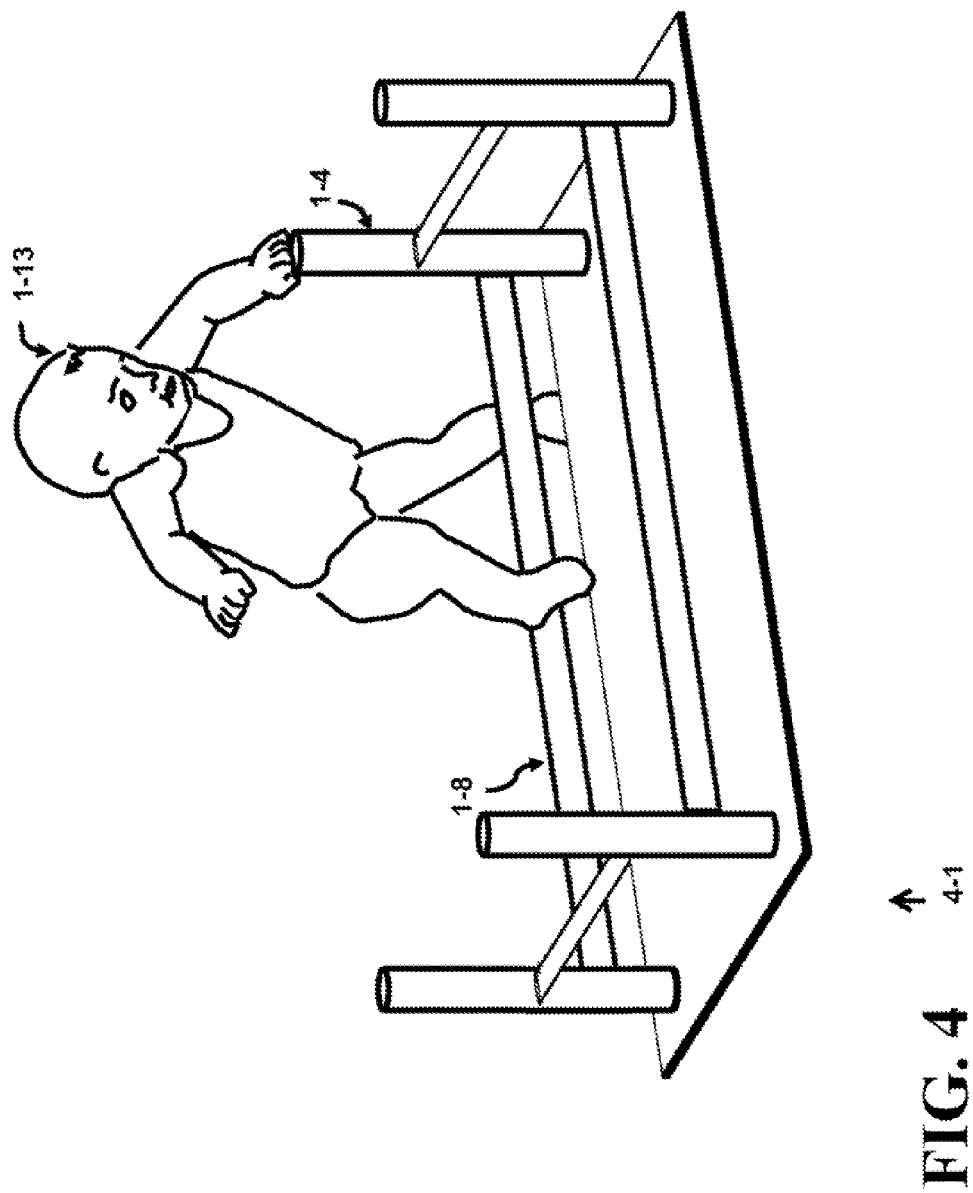
FIG. 4 depicts the toddler using the "grip" of the leg to support the toddler while stepping right leg over the horizontal bar illustrating this inventive technique.
Figure 5:
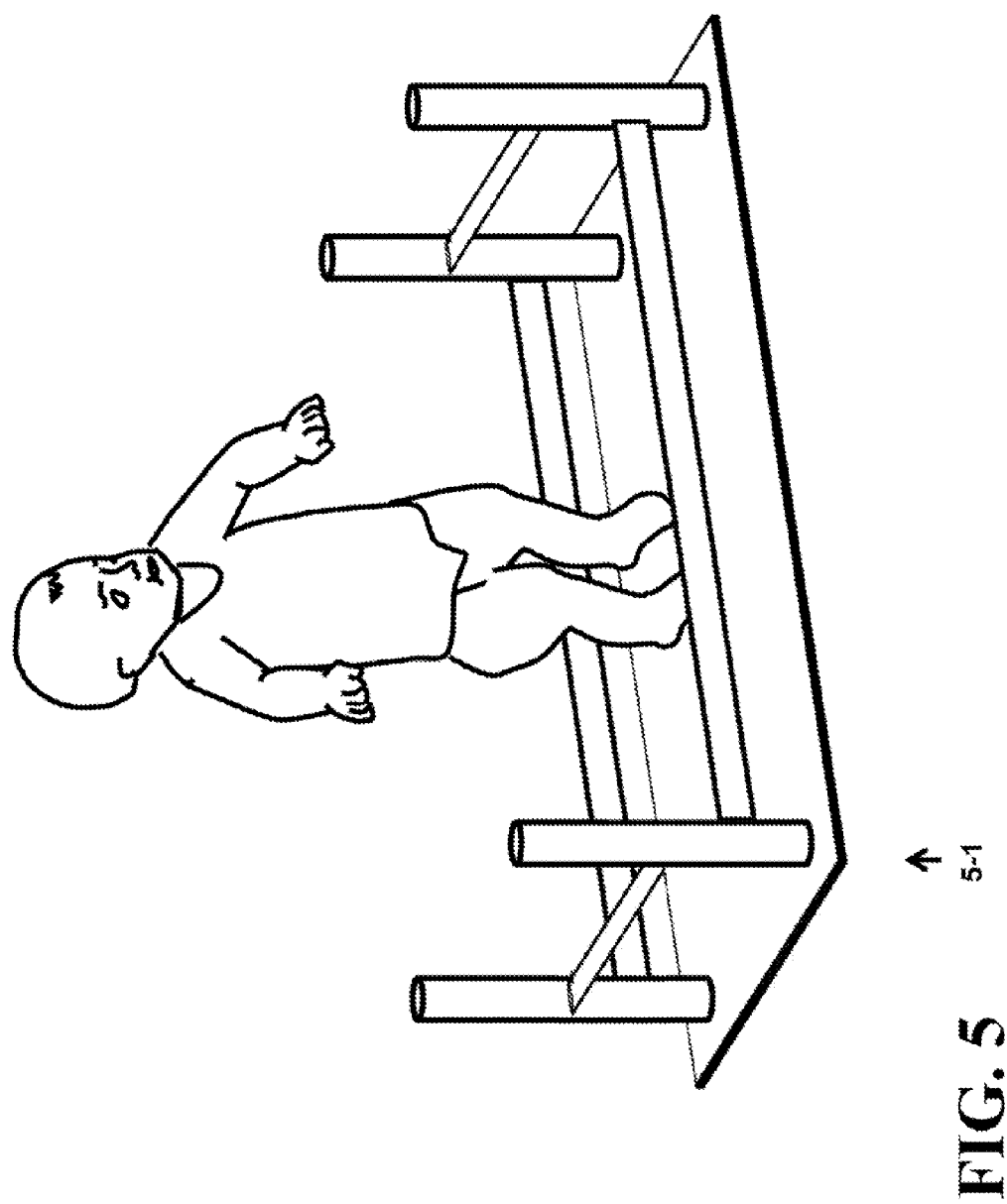
FIG. 5 illustrates the toddler successfully stepping over the horizontal bar illustrating this inventive technique.

However, as FIG. 3 illustrates, the toddler 1-13 refuses to give up and this time approached one of the legs 1-4 in the drawing 3-1. The toddler grips onto the leg 1-4 and uses this leg as a support to cross over the cross support beam 1-8 as illustrated in the drawing 4-1 in FIG. 4. This time the toddler was successful and now was within the area corralled by the cross support beams as depicted in the drawing 5-1 in FIG. 5.

Figure 6:
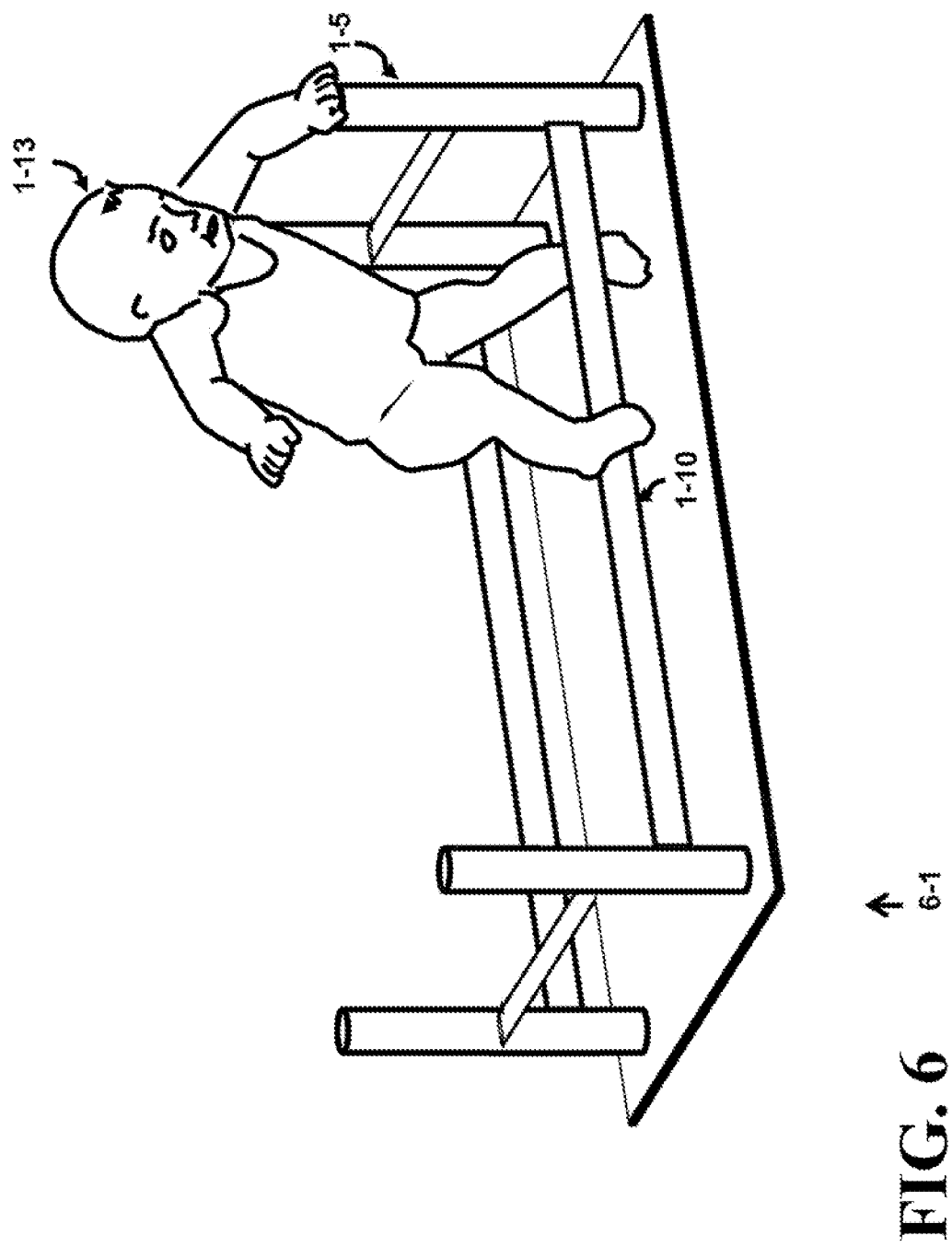
FIG. 6 shows the toddler stepping over the horizontal bar while holding onto a grip of the leg illustrating this inventive technique.
Figure 7:
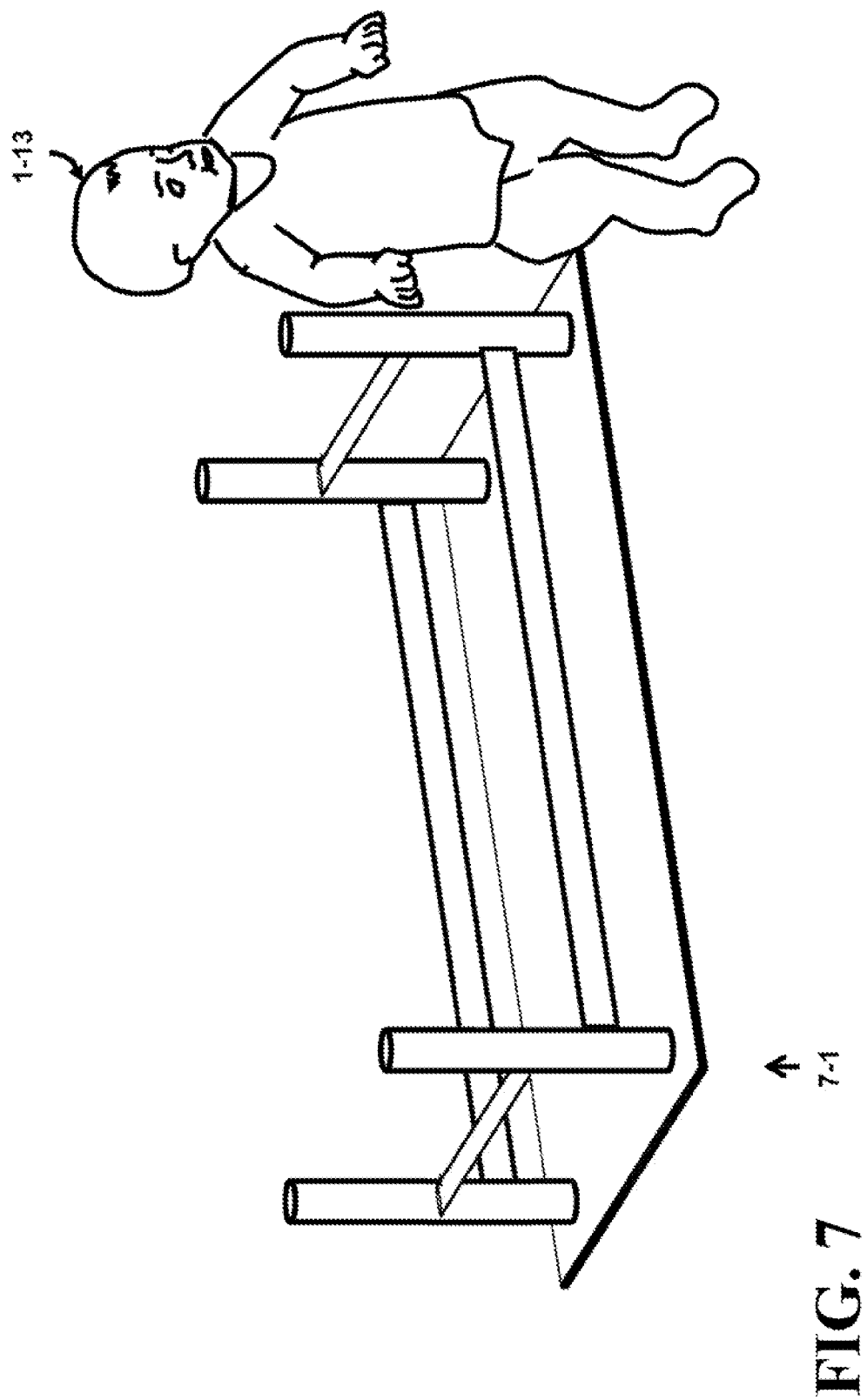
FIG. 7 depicts the toddler successfully stepping over the horizontal bar illustrating this inventive technique.

In FIG. 6, the drawing 6-1 illustrates that the toddler 1-13 now uses the leg 1-5 as a grip to step over the cross support beam 1-10 and support the toddler. As the drawing 7-1 in FIG. 7 shows, the toddler 1-13 is again successful. The toddler continued to repeat the process of stepping over the cross support beam using the legs as grips. Each attempt showed improvement and the toddler continued playing with the table in the upside down mode until the toddler developed the confidence to attempt an independent stepping of the cross support beam again.

Figure 8:
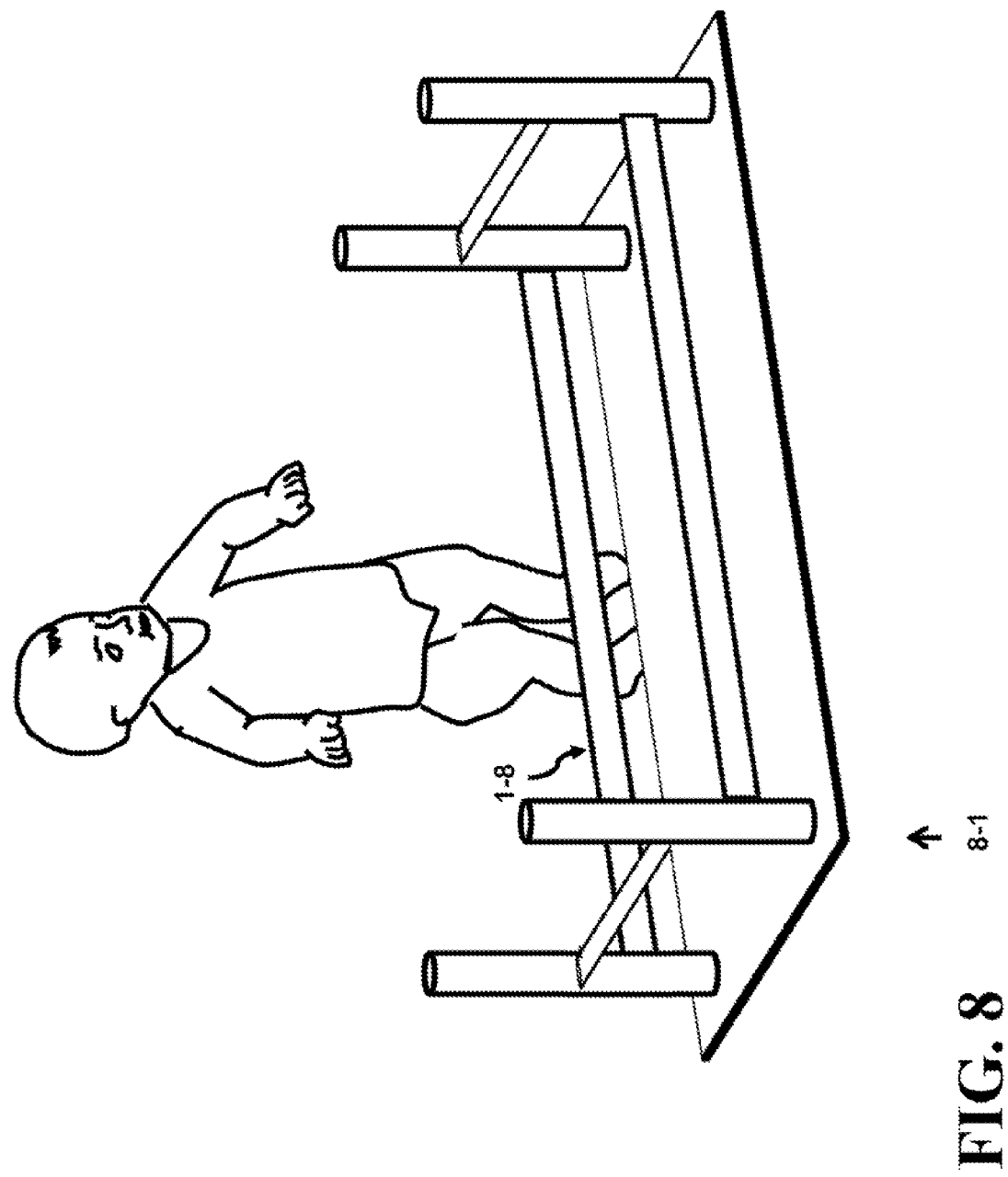
FIG. 8 illustrates the toddler attempting to independently step over a horizontal bar (without the use of a grip) illustrating this inventive technique.
Figure 9:
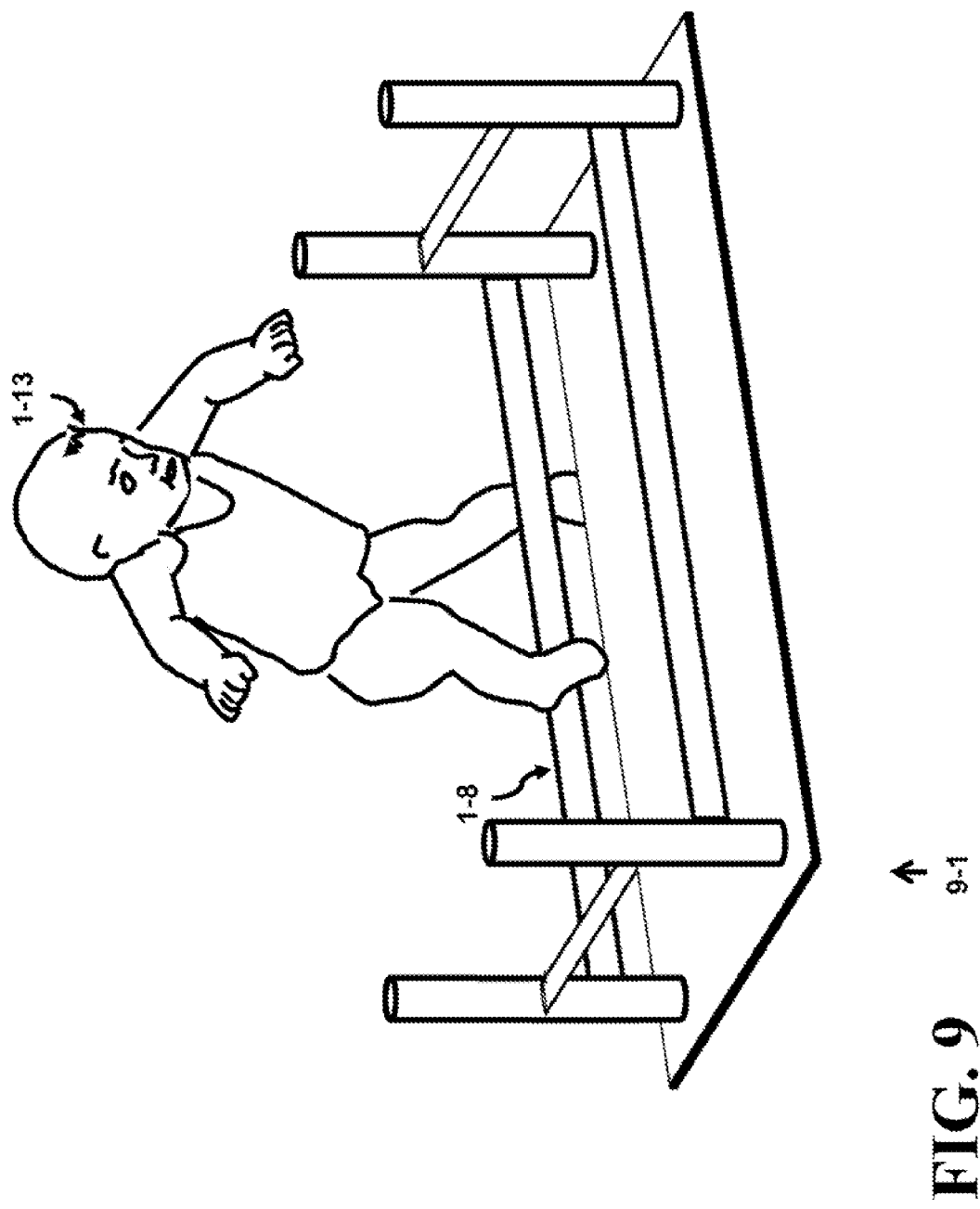
FIG. 9 shows the toddler independently stepping over the horizontal bar illustrating this inventive technique.
Figure 10:
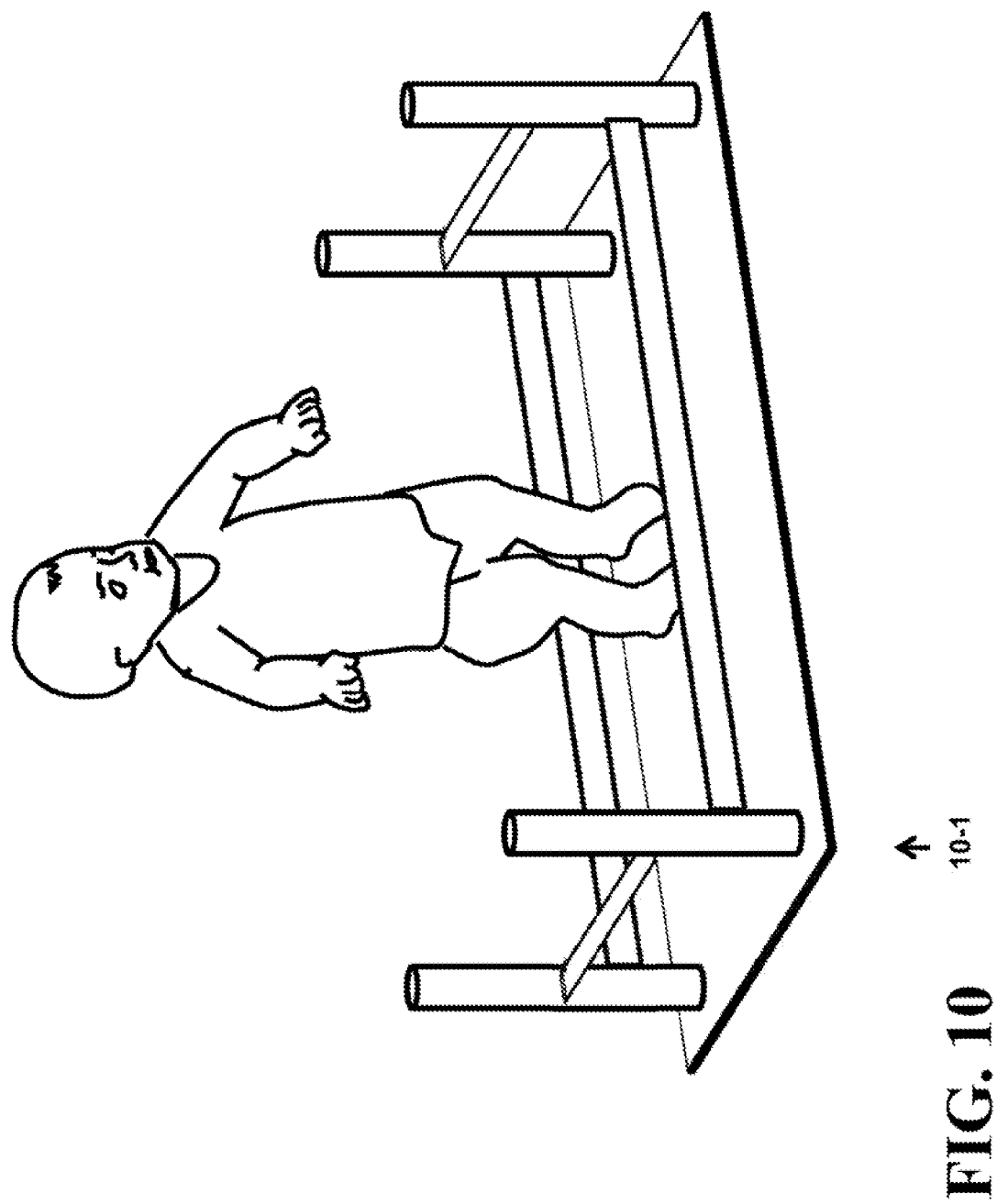
FIG. 10 depicts the toddler successfully stepping over the horizontal bar without the aid of a grip illustrating this inventive technique.
Figure 11:
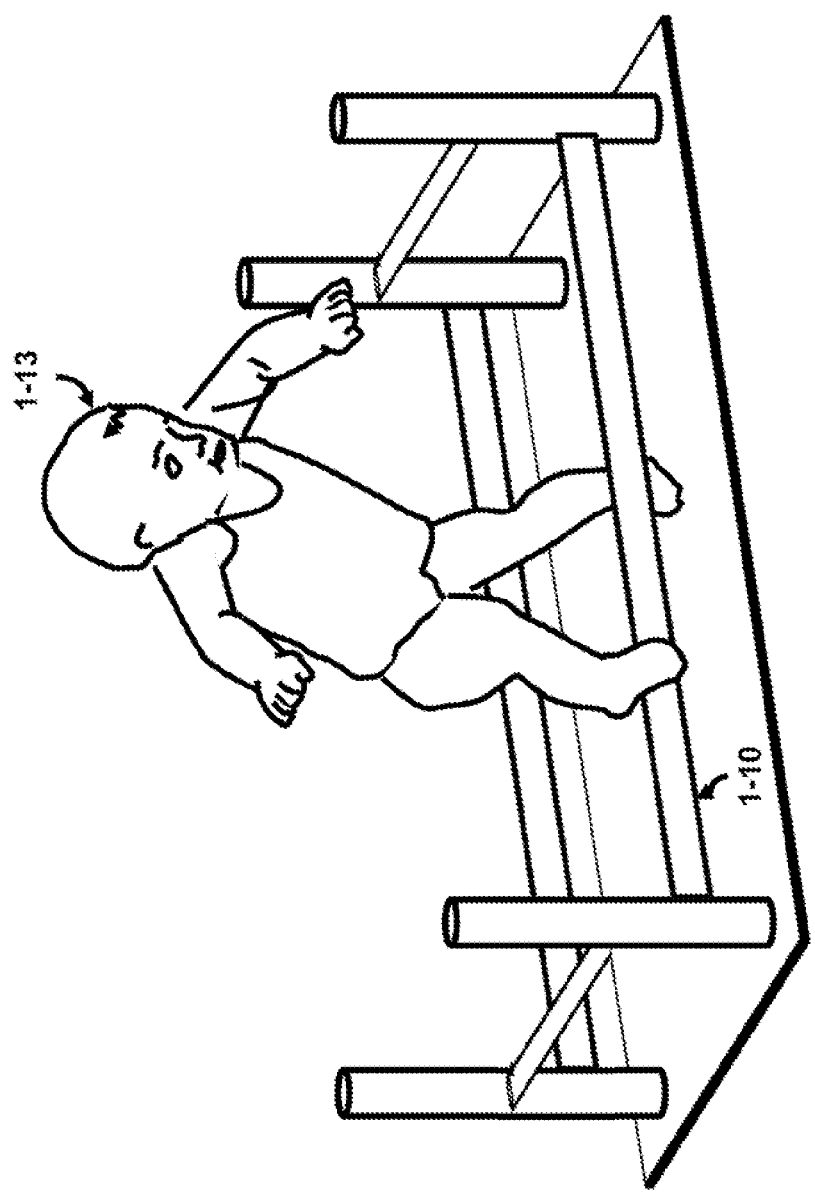
FIG. 11 illustrates the toddler attempting to independently step over a horizontal bar (without the use of a grip) illustrating this inventive technique.
Figure 12A:
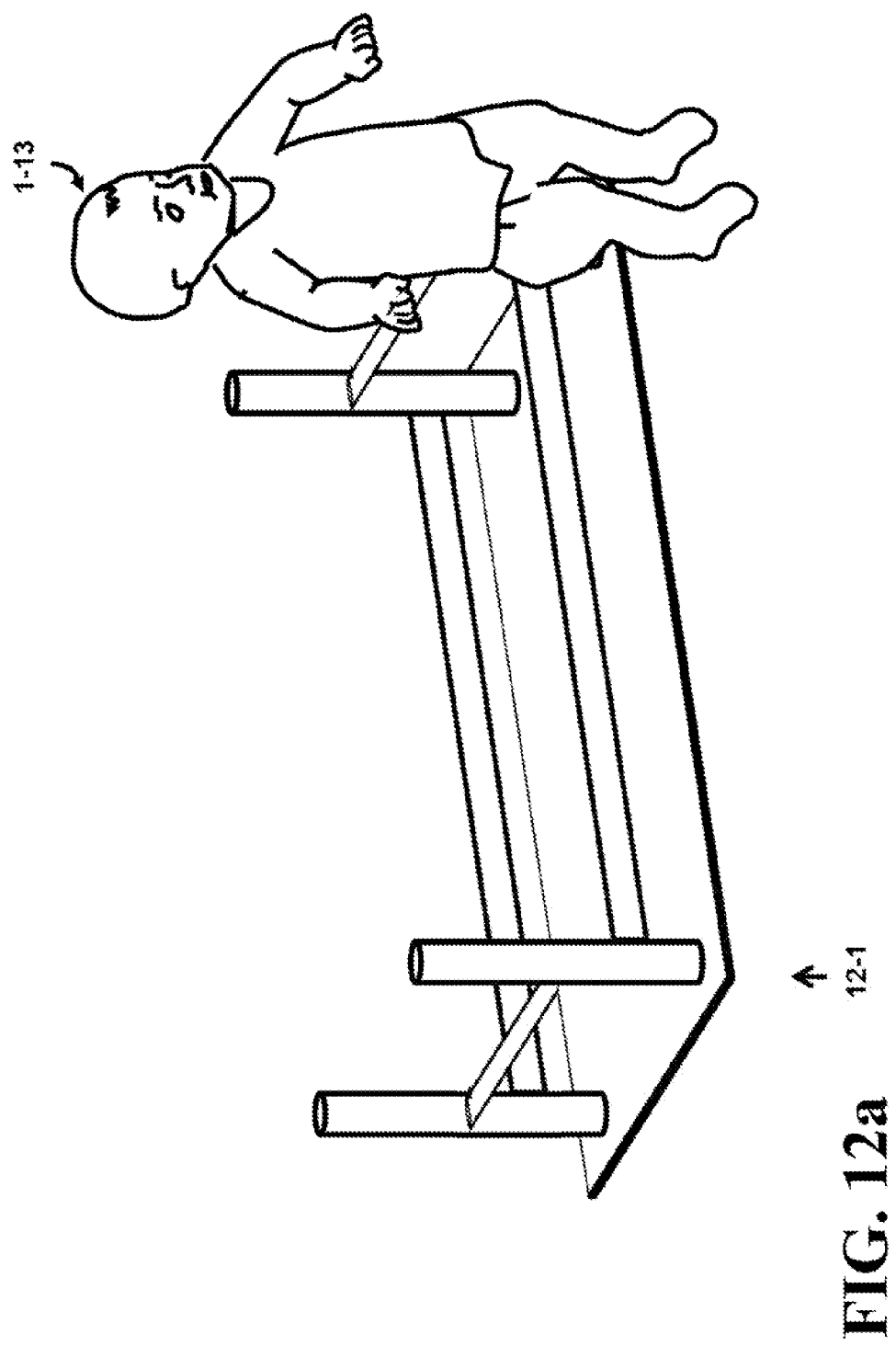
FIG. 12a shows the toddler successfully stepping over the horizontal bar without the use of a grip illustrating this inventive technique.
Figure 12B:
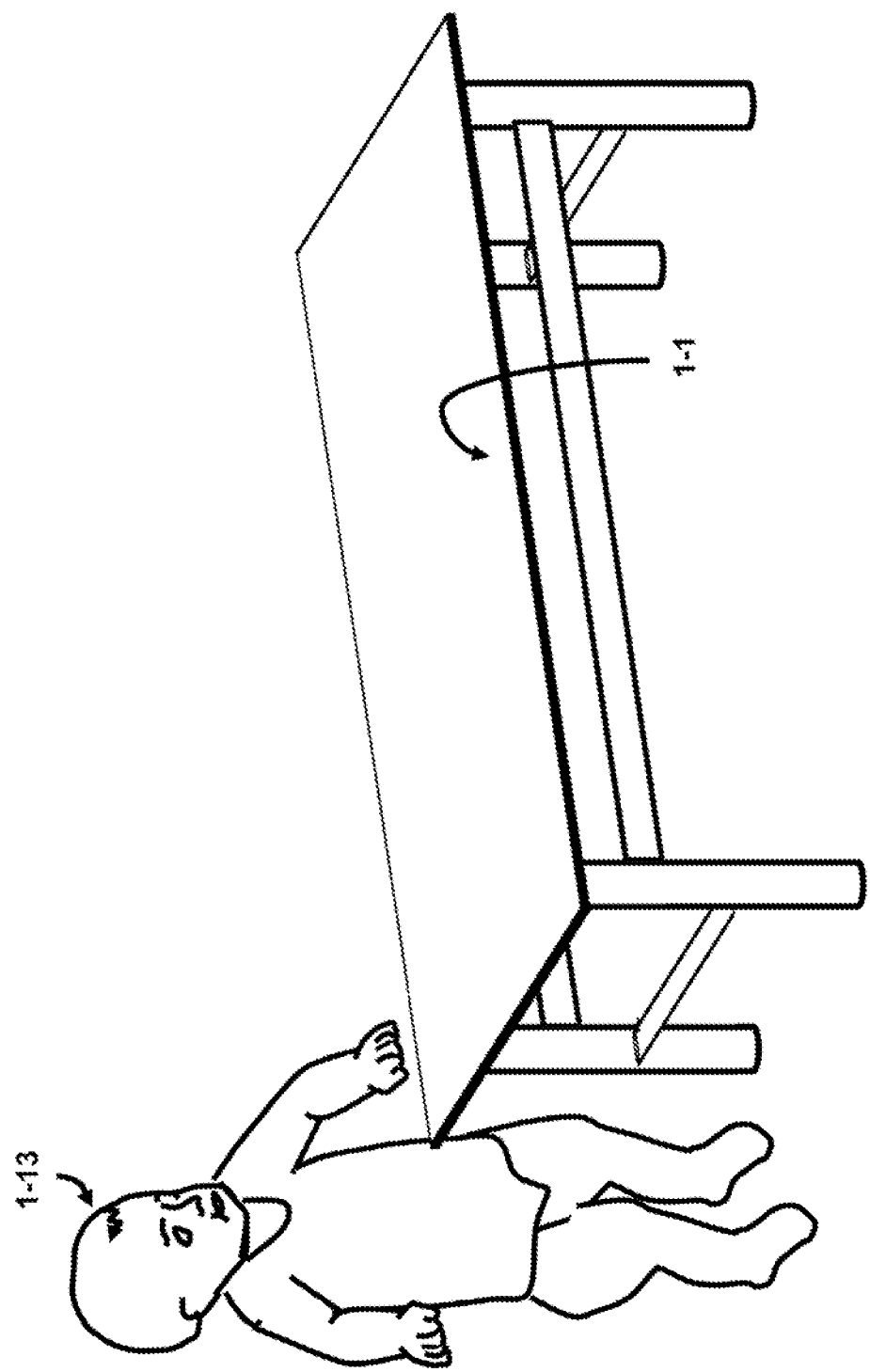
FIG. 12b shows the toddler standing next to the table in the right side up mode after being flipped right side up again.

FIG. 8 illustrates the toddler preparing to perform an independent step over the cross support beam 1-8 as depicted in 8-1. FIG. 9 depicts the toddler 1-13 stepping their right foot over the cross support beam 1-8 unaided as indicated in 9-1. FIG. 10 shows the drawing 10-1 where the toddler has successfully stepped over the cross support beam. FIG. 11 illustrates the toddler 1-13 stepping their right foot over the cross support beam 1-10 while the drawing in 12-1 of FIG. 12a shows that the toddler 1-13 has successfully negotiated the cross support beams at a height of 3 inches. FIG. 12b illustrates the table 1-1 being flipped 180° into the right side up mode and positioned next to the toddler 1-13.

Interestingly, the table in the upside down mode presents itself as an inviting structure to the toddler which further enticed the toddler to seek further investigation. Their first attempt of the toddler was to step over the cross support beam unaided, but ended up being unsuccessful. The legs appearing as "grips" provided support to the toddler while stepping over the cross support beams that were 3 inches high. The support that the grip gave to the toddler allowed the toddler to practice stepping over the cross support beam until the toddle developed the ability to step independently over the beam. Once the toddler mastered this stepping, the table can be flipped right side up into the right side up mode and serve as the useful function of a coffee table.

One embodiment of the invention is that a table can be flipped upside down into the upside down mode and serve as a tool to improve the kinematic of the leg movement of a toddler who is just learning to step over obstacles. Once the step at the given height is mastered, the table can be flipped right side up into the right side up mode and used as a table again.

Another embodiment is to introduce height adjustment the cross support beams into the table 13-1. FIG. 13a illustrates the table in the upside down mode where the cross support beam 13-6 can be positioned over the range of various heights 13-14. This structure exposes the legs 13-2 to 13-5 and cross support beams 13-6 to 13-9. Three of the legs show a ball-like addition 13-10 to 13-12 added to the end of the leg (not shown on the last leg to simplify drawing). These serve to provide an easy grip for the toddler as well as providing a soft protection against the point of the leg if the toddler falls. In addition, the exposed components can be covered with protective foam so that a falling toddler would not hit any hard surfaces. The junction between a proposed cross support beam 13-13 and the leg 13-2 is highlighted by the dotted oval 13-15. Several possibilities are provided for the view 13-16 provided in FIG. 13a.

The first possibility is illustrated using FIG. 13b through FIG. 13d that presents one way of adjusting the height of the cross support beam 13-13. FIG. 13b presents one possibility of what can be inside the view 13-16 of FIG. 13a which shows the leg 13-2a with perforated holes 13-17. FIG. 13c illustrates the view 13-15 demonstrating the coupling of the leg 13-2a with the cross support beam 13-13a. A collar 13-19 that slides on the outside diameter of the leg 13-2a couples the cross support beam 13-13a to the leg. A sleeve 13-18 that moves back and forth as illustrated is used to adjust the height of the cross support beam 13-13a. The detail of the mechanism is further depicted in FIG. 13d which shows the sleeve 13-18 pushed to the left by a spring loaded assemble (not shown) inside the sleeve 13-18. This exposes the pin 13-21 which is inserted into one of the holes 13-17 in the leg 13-2a. To adjust the cross support beam 13-13a, the sleeve is pulled to the right against the spring loaded assembly causing the pin 13-21 to be withdrawn within the cross support beam 13-13a thereby allowing the cross support beam 13-13a to move vertically.

The view of 13-15 of FIG. 13a as applied to another apparatus that can be used to adjust the height of the cross support beams is illustrated in FIG. 14a. The leg 13-2b is coupled to the beam 13-13b by the coupling unit 14-3 and adjusted by the sleeve 14-2. The sleeve rotates clockwise to loosen and counter clockwise to tighten the cross support beam to the leg. The view 14-4 along the length of the leg is further illustrated in FIG. 14b. The sleeve 14-2 has a thread on the inside diameter that matches the thread 14-5 associated with the belt 14-6. As the sleeve is turned counter clockwise the belt 14-6 tightens around the leg 13-2b and develops a friction that prevents the vertical movement of the cross support beam 13-13b. A pin or clamp 14-7 is used to hold the belt to the beam 13-13b.

Another embodiment of cross support beam adjustment apparatus 14-8 is illustrated in FIG. 14c. The leg 13-2c supports a bolt 14-9 (exposed portion can be rubber coated) whose shaft 14-10 has threads and connected to a nut 14-11 that is secured to the cross support beam 13-13c. As the bolt is turned clockwise, the cross support beam 13-13c is lifted. Similarly, when turned counter clockwise, the beam 13-13c lowers.

A vertical slot assembly apparatus is illustrated in FIG. 14d and FIG. 14e. The view 13-16 of the leg in FIG. 13a for this additional embodiment is depicted in FIG. 14d as the drawing 14-13. FIG. 14e illustrates the leg 13-2d with the cross support beam 13-13d having a hook structure 14-14 that engages into the slots illustrated in FIG. 14d. The height of the cross support beam is adjusted by positioning the beam 13-13d into another slot of the leg 13-2.

A yet additional apparatus to attach the cross support beam 13-13e to the leg 13-2e is depicted in FIG. 14f. The cross support beam 13-13e is coupled to a clamp that holds onto the leg 13-2e. The clamp comprises a lower portion 14-15 that fits half way around the leg 13-2e and is connected to a pin 14-16. The pin 14-16 allows the upper portion 14-17 of the clamp to rotate around the pin 14-16 to form the clamp. A pin or screw 14-18 is used to tighten the upper portion of the clamp to the lower portion of the clamp so that the cross support beam is firmly coupled to the leg 13-2e.

Figure 15:
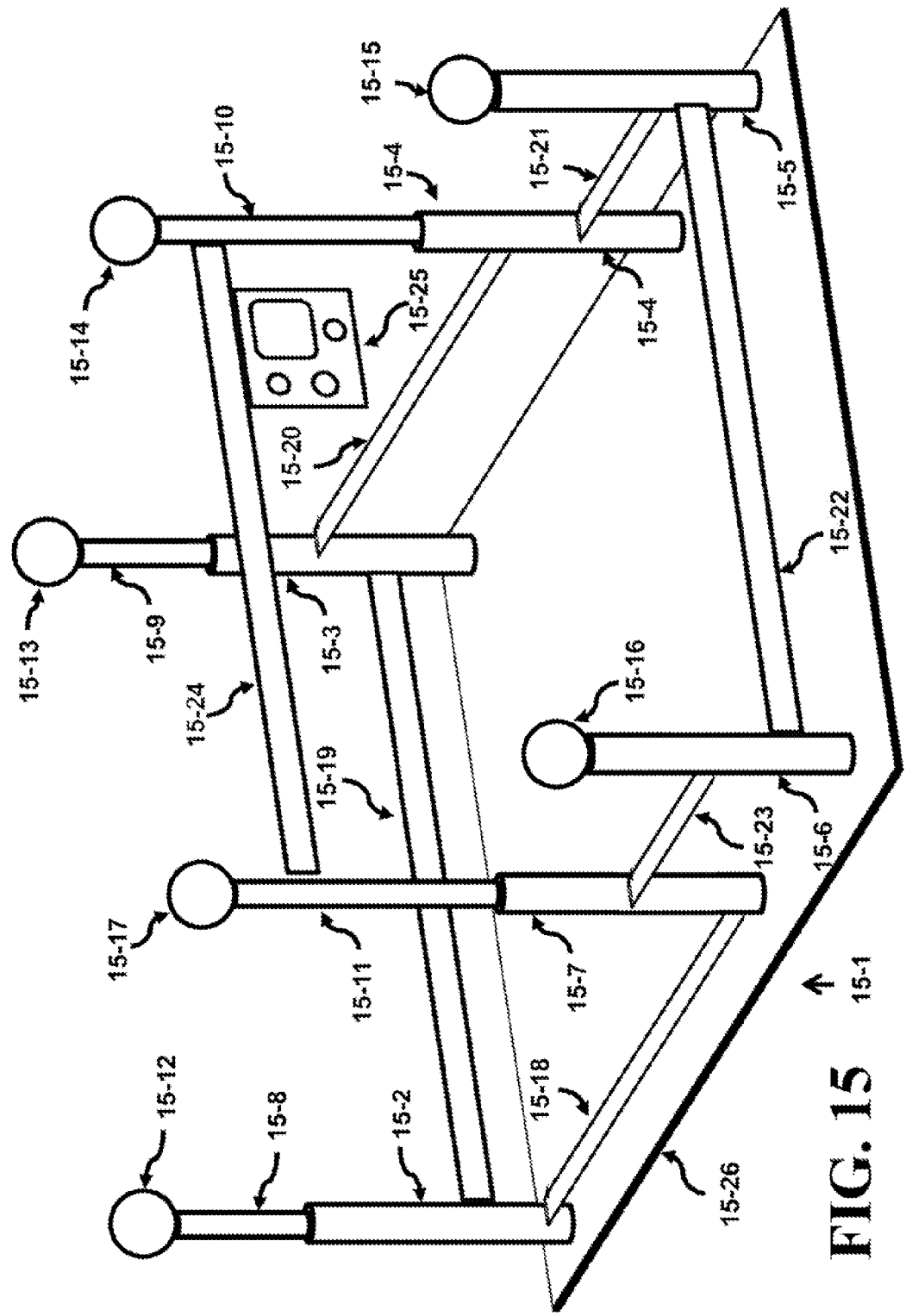
FIG. 15 shows a 3-d perspective of another toddler gym with 6 legs illustrating this inventive technique.

Another apparatus of a table flipped upside down 15-1 is illustrated in FIG. 15. The number of legs and cross support beams that are used can vary depending on the cost of the final product, the exercise that the apparatus is targeting in the toddler, and the area displaced by the table. The legs are 15-2 to 15-7 where each has a telescopic leg extension 15-8 to 15-11. The leg extensions for legs 15-5 and 15-6 are not illustrated. Each leg has a grip 15-12 to 15-17. The cross support beams 15-18 to 15-24 can be adjusted by using one of the earlier presented adjustable assemblies. A toddler interactive electronic device 15-25 can be hung from one of the beams and provide a reward to the toddler if the toddler enters different segmented sections of the surface 15-26. Each of the cross support beams can be individually adjustable in height so that the toddler can be challenged as they master stepping over each obstacle or beam. Once the cross support beams have a height that greater than the hip of the toddler, the cross support beam becomes a horizontal grip that the toddler can use to hold and either practice walking or master horizontal grip holding.

Figure 16:
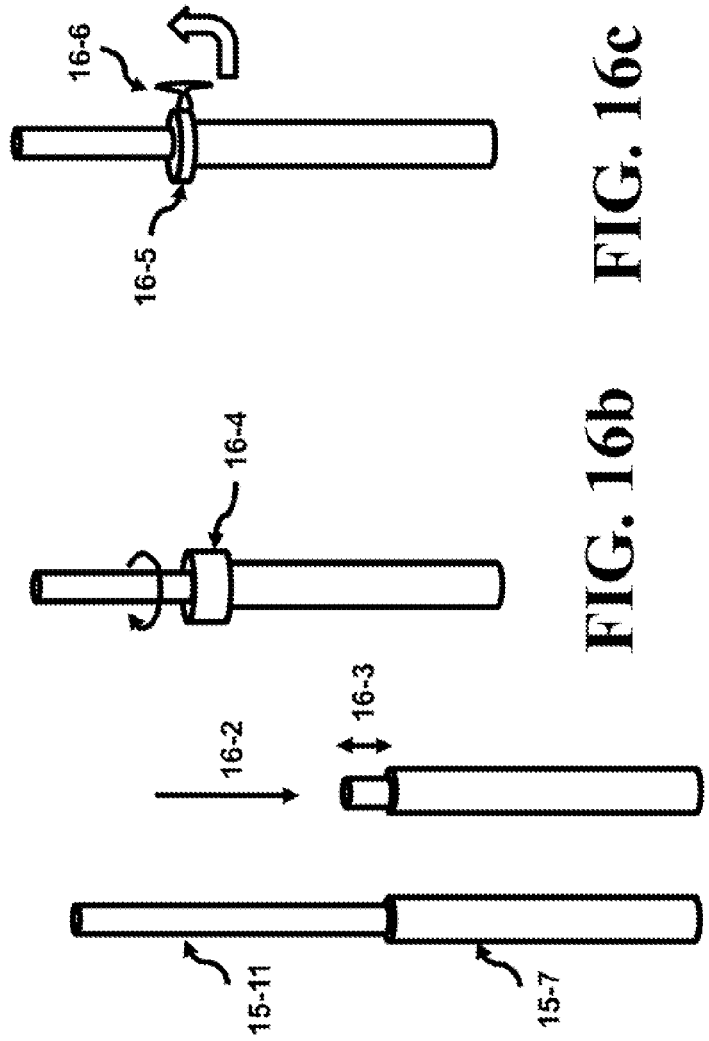
FIG. 16a depicts telescoping legs illustrating this inventive technique.
FIG. 16b illustrates a twist lock for the telescoping leg illustrating this inventive technique.
FIG. 16c shows a snap lock for the telescoping leg illustrating this inventive technique.
FIG. 16d depicts leg extension segments illustrating this inventive technique.
FIG. 16e illustrates the placement of the leg extension on a leg illustrating this inventive technique.

A first embodiment of the telescoping leg is illustrated in FIG. 16a. The leg 15-7 has a sliding telescopic leg extension 15-11 that can be adjusted 16-2 by sliding the leg into the cavity and adjusting the length of the extension 16-3.

FIG. 16b illustrates a collar 16-4 that tightens the extension when rotated in the direction as shown. Another apparatus to hold the extension is provided in FIG. 16c. The collar 16-5 is snapped tightened by the assembly 16-6. Once snapped, the collar immobilizes the extension to the leg.

Another apparatus for leg height adjustments is to screw extensions 16-7 to 16-11 onto the end of the legs. An example is illustrated in FIG. 16e which shows a short extension 16-11 screwed onto the end of the leg 15-7.

Figure 17:
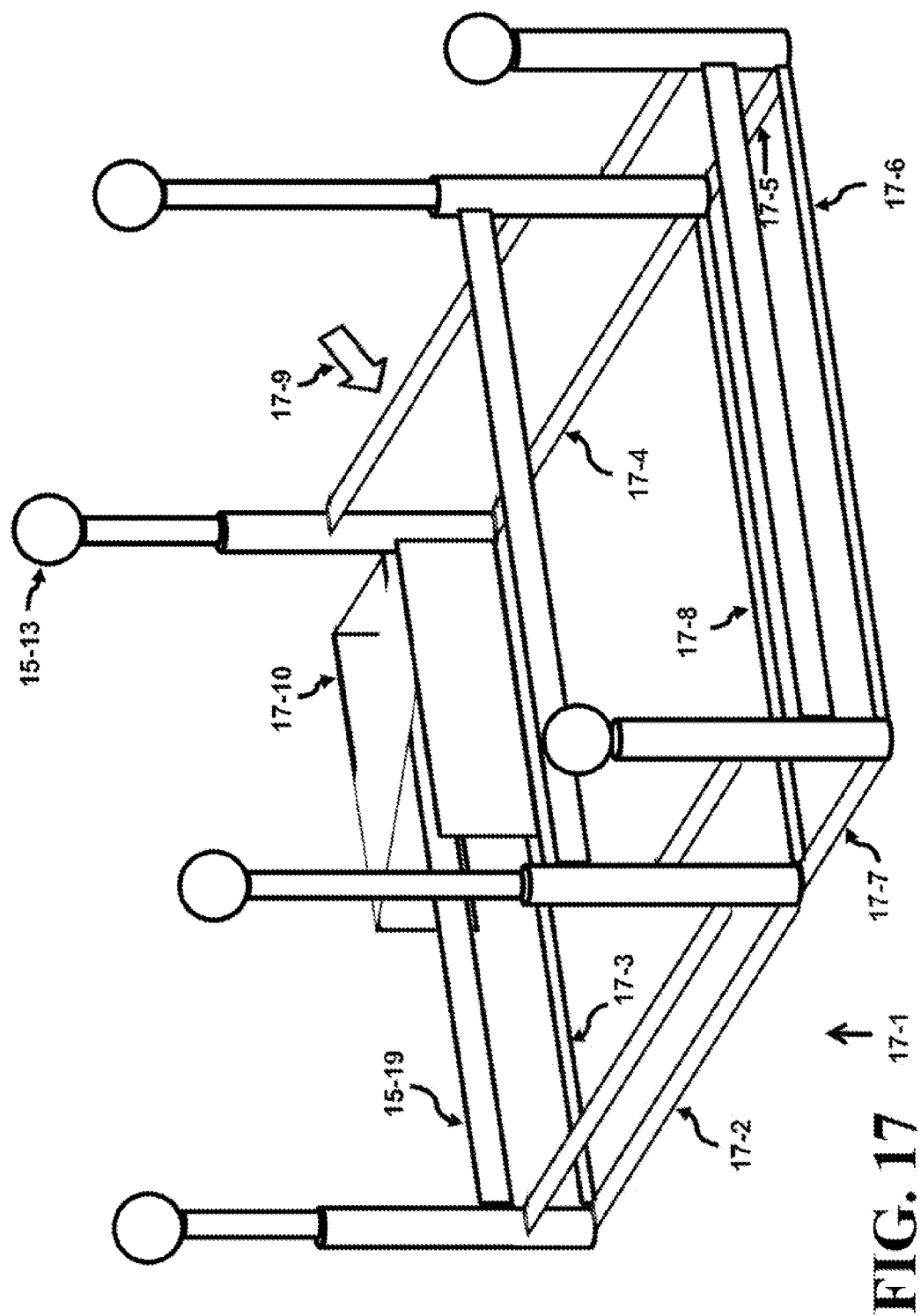
FIG. 17 shows a 3-d perspective of another toddler gym with 6 legs and without the top surface of a table and a step illustrating this inventive technique.

FIG. 17 depicts the table 17-1 in the upside down mode having flat strips 17-2 to 17-8 coupling the tops of the legs together to provide additional strength. The table top is not shown for simplicity. A movable or positional step 17-10 is illustrated snapped to the horizontal beam 15-19 and can be used by the toddler to learn how to step up and to step down the positional step. The toddler can hold onto the grip 15-13 while learning the step movements. The positional step can be stored to a clip on the bottom surface of the table top.

Figure 18:
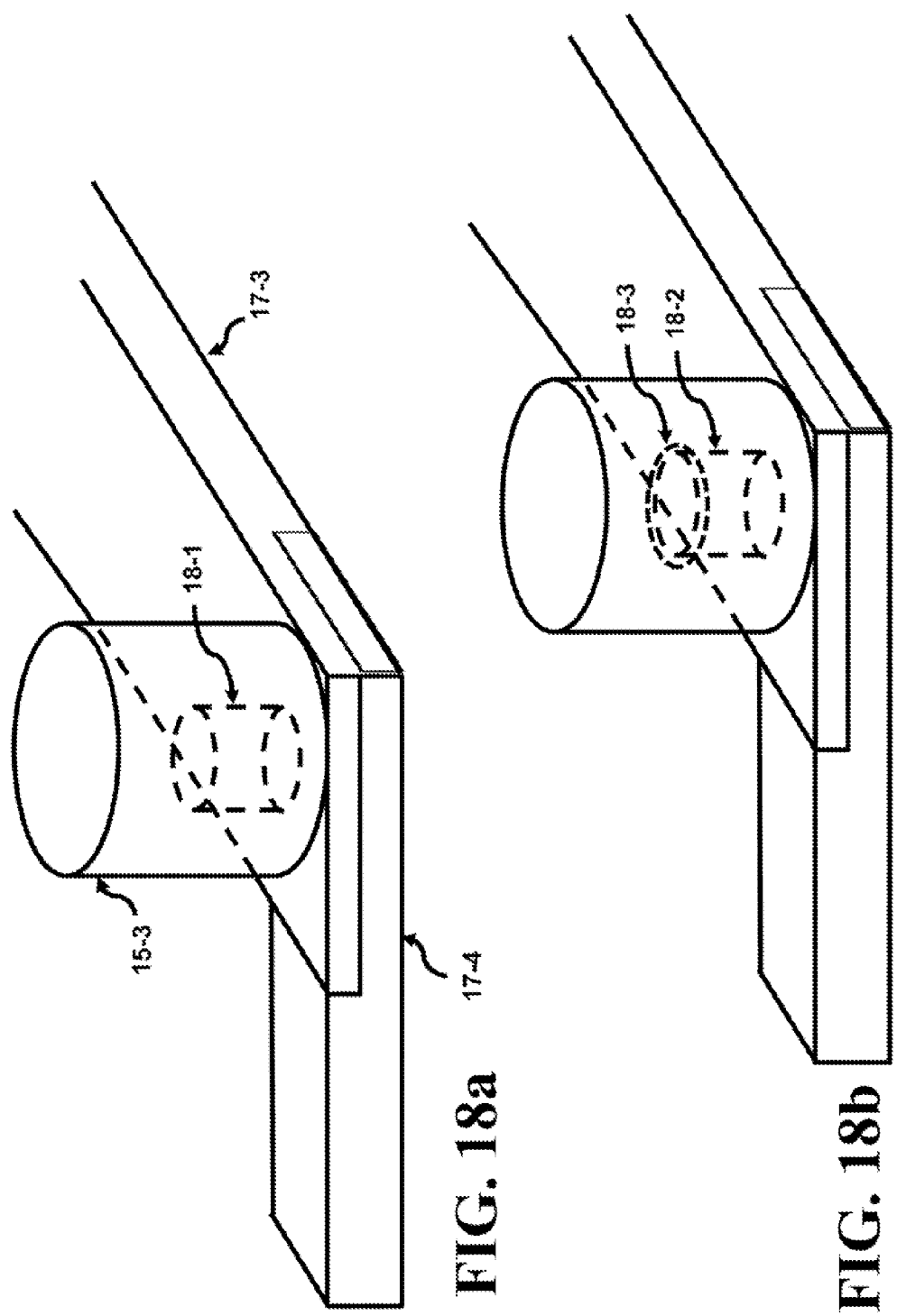
FIG. 18a depicts the coupling of the table top support to the leg illustrating this inventive technique.
FIG. 18b illustrates a coupling of the table top support to the leg using a different connector illustrating this inventive technique.

A 3-D perspective view 17-9 of the corner of the table edge is presented is presented in FIG. 18a and FIG. 18b. The flat strips 17-4 and 17-3 have slots that accept the other. An attachment (rivet, screw, bolt) 18-1 in FIG. 18a couples both flat strips 17-4 and 17-3 to the leg 15-3. A press fitted assembly 18-2 with a lip 18-3 is presented in FIG. 18b. The entire assemble can be press fitted together until the lip of the assembly snaps into place within the leg 15-3.

Figure 19:
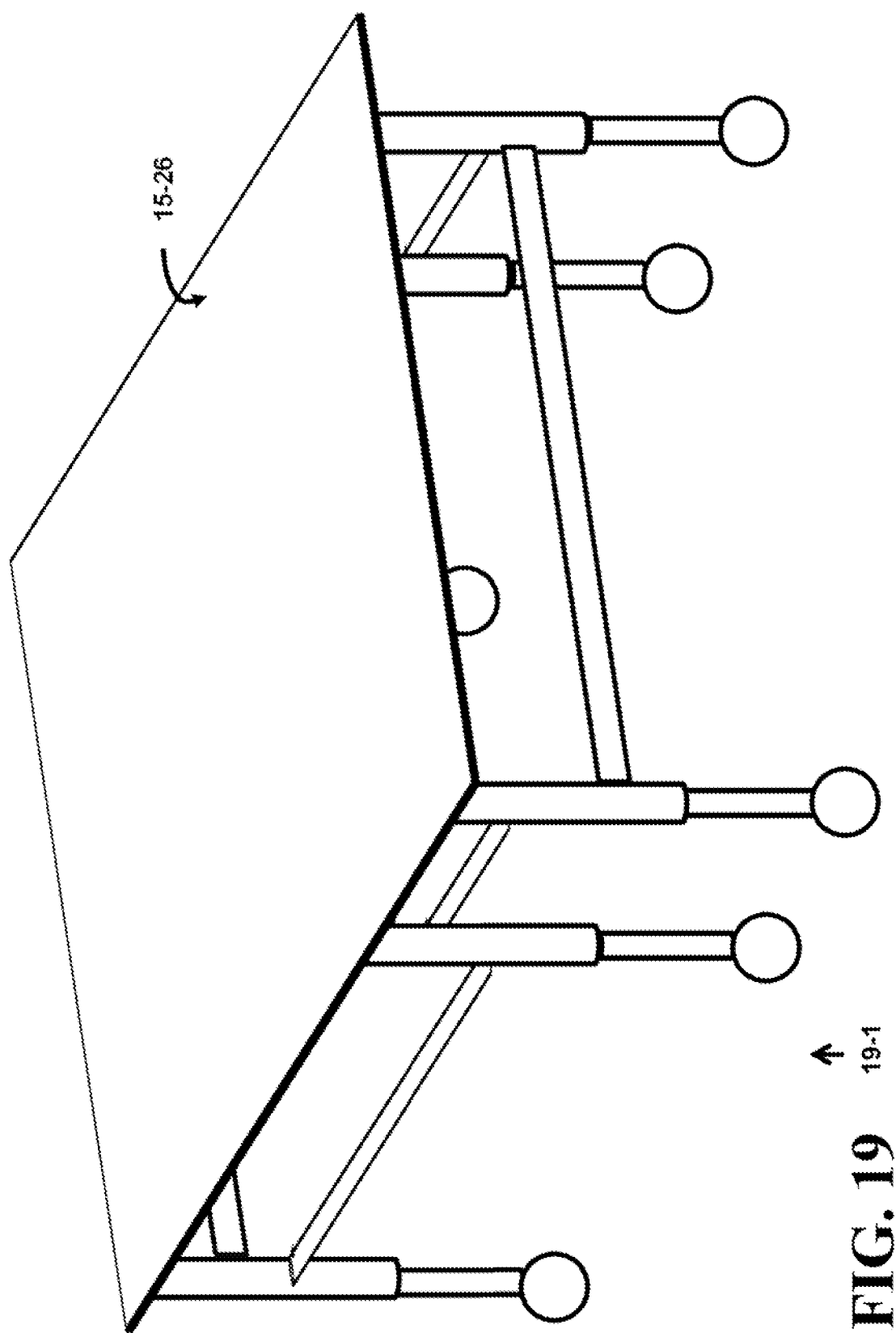
FIG. 19 shows a 3-d perspective of the table after the toddler gym in FIG. 15 is flipped in the right side up mode illustrating this inventive technique.

The upside down table in FIG. 15 can be flipped right side up as shown by 19-1 and as illustrated in FIG. 19 and stood on the legs to provide a table surface 15-26 for the toddler. Note that the height of the table can be adjusted as the toddler grows. Besides adjusting all legs to the same height, the legs can be adjusted to make a slanting table to allow the toddler to draw pictures where the toddler's back is less curved. The table with a flat surface in the right side up mode and a slope of the flat surface can be adjusted by varying the length distribution of the telescopic legs Finally, it is understood that the above description is only illustrative of the principles of the current invention. It is understood that the various embodiments of the invention, although different, are not mutually exclusive. In accordance with these principles, those skilled in the art may devise numerous modifications without departing from the spirit and scope of the invention. The toddler gym can use electronic motors to turn any screws in the supports such that the length of the legs or height of the cross support beams can be adjusted by mechanical gears drive by electronic motors. The toddler gym can have at least one processor comprising a CPU (Central Processing Unit), microprocessor, multi-core-processor, DSP, a front end processor, or a co-processor. All of the supporting elements to operate these processors (memory, disks, monitors, keyboards, power supplies, etc), although not necessarily shown, are known by those skilled in the art for the operation of the entire system.

What is claimed is:

1. An apparatus which can be operated in one of two modes comprising:
   a plurality of legs;
   a processor comprising a Central Processing Unit (CPU);
   at least one electronic motor controlled by the processor;
   a plurality of mechanical gears coupled to the at least one electronic motor;
   the plurality of mechanical gears are configured to adjust a length of the at least one leg, wherein a point on a surface of the apparatus can be adjusted in height.

2. The apparatus of claim 1, wherein
   at least two legs are adjusted in length to slant the surface of the apparatus at an angle.

3. The apparatus of claim 1, wherein
   at least three legs are adjusted in length to vary a height of the surface of the apparatus.

4. The apparatus of claim 1, further comprising:
   a plurality of cross support beams; and
   at least one cross support beam is adjustable in distance from a floor.

5. The apparatus of claim 1, further comprising:
a right side up mode where the apparatus is configured to operate as a table.

6. The apparatus of claim 1, further comprising:
an upside down mode where the apparatus is configured to operate as a toddler gym.

7. The apparatus of claim 6, further comprising:
a grip that can be held by a toddler, wherein
the grip maintains a balance of the toddler.

8. A method of adjusting a length of at least one leg of a plurality of legs of a table which can be converted into a toddler gym, comprising the steps of:
configuring a processor comprising a Central Processing Unit (CPU) to control a plurality of electronic motors;
using the plurality of electronic motor to adjust mechanical gears, wherein
the adjustment of the mechanical gears is configured to adjust the length of the at least one leg.

9. The method of claim 8, further comprising the steps of:
adjusting the length of at least two legs to slant a surface of the table at an angle.

10. The method of claim 8, further comprising the steps of:
adjusting the length of at least three legs to vary a height of a surface of the table.

11. The method of claim 8, further comprising the steps of:
adjusting a distance of at least one of a plurality of cross support beams from a floor.

12. The method of claim 8, further comprising the steps of:
configuring the table to operates in a right side up mode.

13. The method of claim 8, further comprising the steps of:
configuring the table to operate in an upside down mode.

14. The method of claim 13, wherein
a toddler uses the upside down mode to practice assisted walking by holding a horizontal grip.

15. An apparatus with two modes comprising:
an upside down mode wherein the apparatus is configured to operate as a toddler gym;
a right side up mode wherein the apparatus is configured to operate as a table; and
at least three legs, wherein
one or more legs can be adjusted in length.

16. The apparatus of claim 15, wherein
at least two legs are adjusted in length in the right side up mode to slant a surface of the table at an angle.

17. The apparatus of claim 15, wherein
the at least three legs are adjusted in length in the right side up mode to vary a height of a surface of the table.

18. The apparatus of claim 15, further comprising:
a plurality of cross support beams; and
at least one cross support beam is adjustable in distance from a floor.

19. The apparatus of claim 18, further comprising:
at least one cross support beam positioned substantially equal to a height of a step of a toddler when the apparatus is in the upside down mode.

20. The apparatus of claim 19, further comprising:
a grip that can be held by a toddler, wherein
the grip maintains a balance of the toddler.

* * * * *